UNITED STATES PATENT OFFICE.

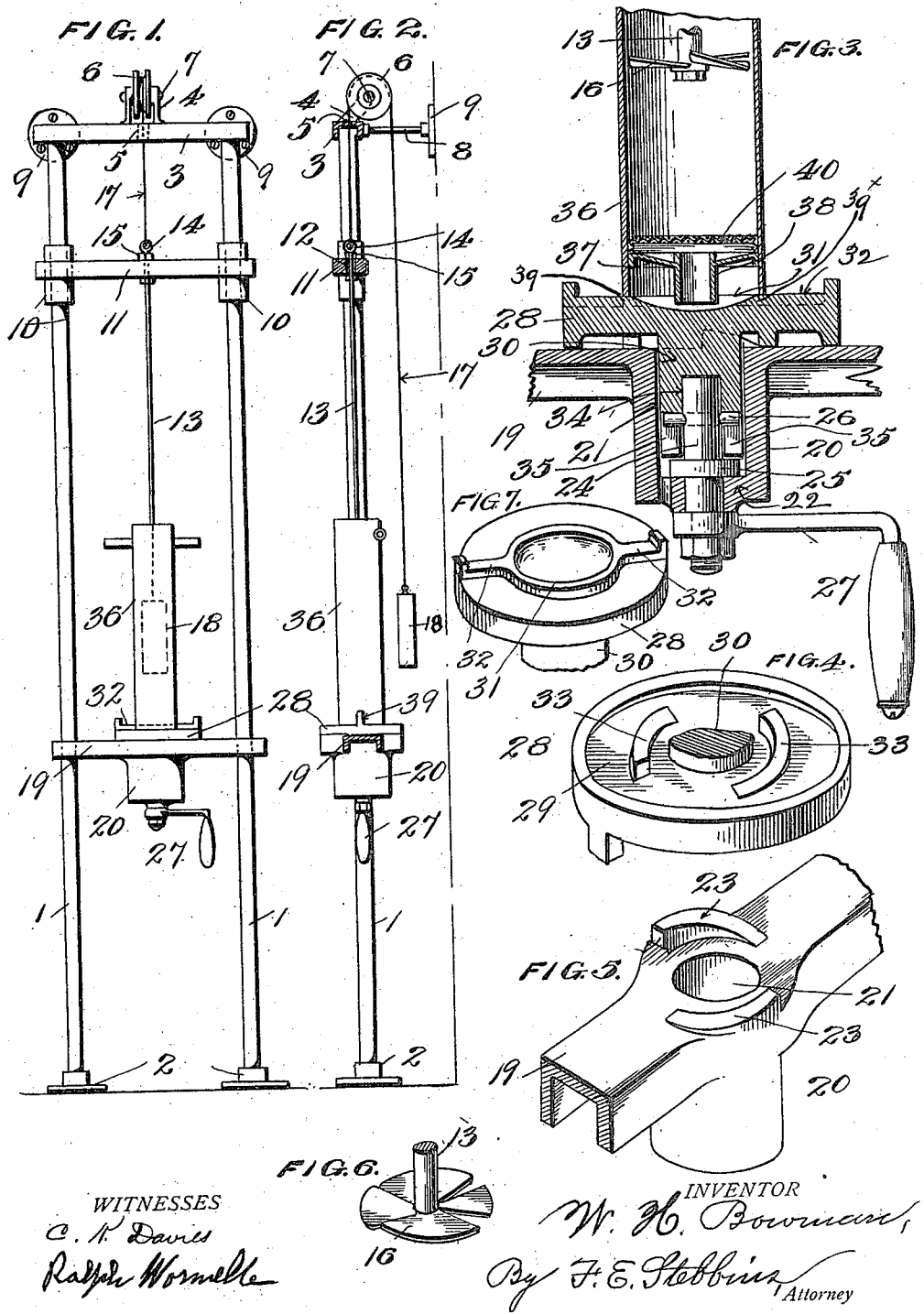

WALTER H. BOWMAN, OF DOVER, NEW HAMPSHIRE.

COMPACTING-MACHINE.

964,203.

Specification of Letters Patent. Patented July 12, 1910.

Application filed February 14, 1910. Serial No. 543,709.

*To all whom it may concern:*

Be it known that I, WALTER H. BOWMAN, a citizen of the United States, residing at Dover, in the county of Strafford and State of New Hampshire, have invented certain new and useful Improvements in Compacting-Machines, of which the following is a specification.

The object of my invention broadly is the provision of a machine for uniformly compacting disintegrated or pulverized material in vessels or receptacles.

Specifically the object is the provision of a machine for uniformly compacting soils in tubes preparatory to experiments which will determine the water holding power or potentiality of the soils, the rates of the flow of water or air, or the rate of the rise of water by capillarity, through them. Accurate comparisons are impossible unless the soil is uniformly compacted in the tubes, and I have devised the machine or apparatus herein described which has proven very efficient for the purpose.

The invention consists in certain novelties of construction and combinations of parts hereinafter set forth and claimed.

The accompanying drawing illustrates an example of the physical embodiment of the invention constructed according to the best method of procedure I have so far devised.

Figure 1 is a view in elevation of the entire machine or apparatus. Fig. 2 is a vertical section of Fig. 1. Fig. 3 is an enlarged section of the socket, soil tube holder, and soil tube; the journal and crank being in elevation. Fig. 4 is a perspective view of the bottom surface of the holder disk. Fig. 5 is a top view of the socket. Fig. 6 shows a propeller or tamping disk in perspective. Fig. 7 is a view in perspective of the soil tube holder.

Referring to the drawings, the numeral 1 designates two vertically disposed or upright tubes arranged parallel and spaced apart; 2, two socket castings with perforated flanges for the reception of screws to secure the uprights to the floor; 3, a top cast cross bar with sockets to receive the upper ends of the tubes; 4, two parallel obliquely disposed arms perforated at the ends, preferably cast integral with the cross bar; 5, a hole in the cross bar at the base of the arms for the passage of a cord; 6, a grooved and perforated anti-friction wheel between the arms; 7, a pin passed through the arms and wheel, about which pin the wheel rotates as a central axis; 8, rods screwed into sockets at the ends of the cross bar; 9, perforated socket disks at the ends of the rods, the perforations being adapted to receive screws for rigidly attaching the uprights at their top ends to a wall or other support; 10, tubular guides surrounding and movable upon the uprights; 11, the movable cross bar with holes at the ends within which the tubular guides are fixedly secured; 12, a hole through the center of the movable cross bar; 13, a shaft threaded at the upper end, located in the hole 12, and having an eye 14 for the attachment of a cord; 15, a nut by which the upper end of the rod or shaft is fixedly secured to the cross bar; 16, a bladed propeller secured to the lower end of the shaft; 17, a cord with one end secured to the eye 14, passed through the hole 5, over the anti-friction wheel, and having a weight 18 attached at the opposite end, as shown, the weight approximately balancing the movable cross bar, shaft and propeller; 19, a cast fixed cross bar with holes at the ends through which the uprights pass and to which the casting is fixedly attached in any convenient way; 20, a socket piece at the center of the fixed cross bar, preferably cast integral therewith; 21, a centrally disposed hole in the socket piece; 22, a flange at the lower end bounding an opening therethrough; 23, two radial cam shaped surfaces at the top edge or surface of the socket piece; 24, a journal having a flange 25 resting upon the top surface of the flange 22, a pin 26 passed through the upper part with projecting ends, said journal being reduced in diameter and threaded at the lower end; 27, a crank secured to the lower projecting end of the journal 24 by a nut, as shown; 28, a soil tube holder comprising a disk 29 and a cylindrical extension 30 projecting at right angles from the lower surface of the disk; 31, a circular projection with a concave surface at the top surface of the disk; 32, two raised ridges radiating from the circular projection 31 at opposite sides thereof, each terminating at the edge of the disk in a raised lug, as shown said lugs being adapted to engage the surface of a soil tube of relative large diameter; 33, two raised cam surfaces upon the lower surface of the disk and at opposite sides of the cylindrical extension 30, said cams being adapted when the holder is rotated to ride over the cam surfaces 23 at the top of the socket piece; 34, a hole in the cylindrical extension 30 receiving the top end of the journal 24 which it loosely engages; 35, slots to receive the ends of the pin 26 passed through the journal, said pins transmitting rotary motion from the journal to the soil tube holder; 36, a soil tube of any suitable limited diameter; 37, the countersunk bottom of the tube; 38, a centrally disposed tube passed through the bottom and extending to the plane of the end of the soil tube; 39, notches in the body of the edge of the tube which receive the raised ridges 32 on the top surface of the soil tube holder, the tube 38 being disposed within the concavity at the top surface of the disk 29, as shown; and 40 is a loose flanged metallic gauze disk resting with the flange upon the bottom of the soil tube.

The mode of operation is as follows: The parts being in the relative positions shown in Figs. 1 and 2 with the propeller disk at the bottom of the tube, soil is introduced into the tube, filling the same to the point of final filling. The crank is then turned, which action rotates the journal about its axis, rotary motion being transmitted to the tube holder and tube through the medium of the pin. As the crank is turned the cams of the pin. As the crank is turned the cams upon the under surface of the disk ride up upon the under surface upon the socket piece and then drop twice during each complete rotation of the crank, the slots in the cylindrical extension of the soil tube holder allowing the tube holder, tube, propeller, shaft and cross bar to move upwardly and downwardly relative to the pin and journal. The soil on top of the propeller feeds downwardly between the blades and at each intermittent downward motion of the soil tube holder, propeller, shaft, cross bar and soil tube the propeller compacts the soil beneath. As rotation of the crank continues the propeller and shaft gradually move upwardly, and additional soil is added and the process of feeding and compacting continued until the tube is filled to the required height.

The compaction of the soil is produced principally and primarily by the troweling or rubbing motion of the propeller blades. As, for instance, if a soil surface is continually rubbed with a trowel, while small quantities of soil are added, the particles by this process assume positions in close relation to each other and the surface becomes comparatively hard and compact.

Practically as much compaction can be produced with this apparatus without the jar as with it. The jar does add slightly to the degree of compactness, but its function is to keep the soil moving at a uniform speed through the blades. Without the jar, sticky clay soil will hang in a column over the propeller and the number of revolutions required to compact two samples of the same soil will vary. With the jar, the number of revolutions is constant for different samples of the same soil equally prepared.

The desire in this work is not necessarily to produce the greatest compaction possible, but to be able to compact the soils in the different tubes equally; that is, if absolute or complete compaction is represented by 100 per cent., it is requisite to secure some certain percentage of complete compaction, say 60 per cent. Now, the apparatus described accomplishes this, because the weight of the propeller is constant. Compaction is produced, as before stated, by the troweling motion of the blades. The propeller will rise only so fast as the soil beneath it assumes a sufficiently compact state to lift it. The proof of these assertions lies in the fact that the propeller travels upwardly at different speeds in different soils, but always at the same speed in the same soil. This is due to the fact that a fine soil has more particles to be put to place than a course one, and requires more manipulation.

While I have described the machine as specifically adapted for use in uniformly compacting soils in tubes for experimental purposes, said machine or a machine of larger dimensions may be used for other and analogous purposes in compacting disintegrated or pulverized material in vessels or receptacles.

What I claim is:

1. The combination in a machine for compacting disintegrated material in a receptacle, of a holder; means in connection with the holder for detachably securing the receptacle to be filled thereto; means for supporting the holder and receptacle; means suitably supported and adapted for movement within the receptacle for feeding the material downwardly and compacting it; and means for imparting rotary and reciprocating movements to the holder and receptacle.

2. The combination in a machine for compacting disintegrated material in a receptacle, of a holder; means in connection with the holder for detachably securing the receptacle to be filled thereto; means for supporting the holder and receptacle; means suitably supported and adapted for movement within the receptacle for feeding the material downwardly and compacting it; and means for imparting rotary and reciprocating movements to the holder and receptacle and a reciprocating movement to the means for feeding and compacting the material.

3. A compacting machine comprising a holder for a receptacle to be filled, said holder having an extension; a socket piece suitably supported within which the extension of the holder is located; means for imparting rotary motion to the holder; means for imparting a reciprocating motion to the holder while being rotated; a shaft carrying feeding and compacting means; and means for supporting the shaft and compacting means so that they can reciprocate.

4. A compacting machine comprising a holder for a receptacle to be filled, said holder having an extension; a socket piece suitably supported within which the extension of the holder is located; means for imparting rotary motion to the holder; means for imparting a reciprocating motion to the holder while being rotated; a shaft carrying feeding and compacting means; means for weighting the shaft and compacting means; and means for supporting and guiding the shaft and compacting means so they can reciprocate.

5. A compacting machine comprising a journal; means for suitably supporting the journal; means for imparting rotary motion to the journal; a holder for a receptacle to be filled, said holder being loosely connected to the journal; a shaft carrying a feeding and compacting disk; means for supporting the shaft and guiding it in its reciprocating movements; and means for intermittently moving the holder, receptacle carried by the holder, and the shaft and disk longitudinally relative to the journal when the latter is rotated.

6. A compacting machine comprising a journal; means for suitably supporting the journal; means for imparting rotary motion to the journal; a holder for a receptacle to be filled; means for connecting said holder to the journal so it will rotate with the journal and also so it can move longitudinally relative to the journal; a shaft carrying a feeding and compacting disk; means for supporting the shaft and guiding it in its reciprocating movements; and means for intermittently moving the holder, receptacle carried by the holder, and the shaft and disk longitudinally relative to the journal when the latter is rotated.

7. The combination in a compacting machine, of a holder; means for suitably supporting the holder; means in connection with the holder for supporting a receptacle to be filled; means comprising a shaft carrying feeding and compacting means, which latter means are adapted to enter and move within the receptacle; means for movably supporting the shaft and feeding and compacting means; means for transmitting rotary motion to the holder; and cam shaped surfaces between the holder and means for supporting the same whereby when the holder is rotated the cam shaped surfaces will occasion reciprocating motions of the holder.

8. The combination in a compacting machine, of a holder; means for suitably supporting the holder; means in connection with the holder for supporting a receptacle to be filled; means comprising a shaft carrying feeding and compacting means; means for movably supporting the shaft and feeding and compacting means; means for transmitting rotary motion to the holder; and cams in connection with the holder and means for supporting the holder whereby when the holder is rotated reciprocating motions of the same will be occasioned.

9. The combination in a compacting machine, of a frame provided with means for anchoring the same in a vertical position; a fixed cross bar; a socket piece supported by the cross bar; a holder provided with means for receiving a receptacle to be filled, and means for imparting rotary and reciprocating motions to the holder, in engagement with the socket piece; a movable cross bar in engagement with and guided by the frame, said bar carrying a shaft with feeding and compacting means; an anti-friction wheel supported above the movable bar; and a cord and weight; said cord engaging the wheel, one end secured to the movable bar and shaft, and the other end attached to the weight.

10. The combination in a compacting machine, of a frame; a socket piece having cam surfaces, a vertical opening, and a flange 22, supported by the frame; a journal within the socket piece, said journal having a crank secured to its lower end, a flange 25, and a pin 26; and a holder provided with a disk having ridges at its top surface and cams upon its lower surface, a cylindrical projection with a hole to receive the top end of the aforesaid journal and slots within which the pin 26 is located.

11. The combination in a compacting machine, of a frame; supporting means in connection with the frame for holding a receptacle to be filled, and means for imparting rotary and reciprocating movements to the receptacle; means for feeding and compacting material within the receptacle consisting of a shaft with a propeller at the end; and means for suitably supporting the shaft and propeller.

12. The combination in a compacting machine, of a frame; supporting means in connection with the frame for holding a receptacle to be filled, and means for imparting rotary and reciprocating movements to the receptacle; means for feeding and compacting material within the receptacle consisting of a shaft with a propeller at the end; and an anti-friction wheel, weight and cord in engagement with the shaft and propeller.

In testimony whereof I affix my signature in presence of two witnesses.

WALTER H. BOWMAN.

Witnesses:
RALPH S. MARSH,
CHAS. W. HILLS.